July 29, 1952        R. D. HANCOCK        2,605,094
ACCELEROMETER
Filed Oct. 2, 1950
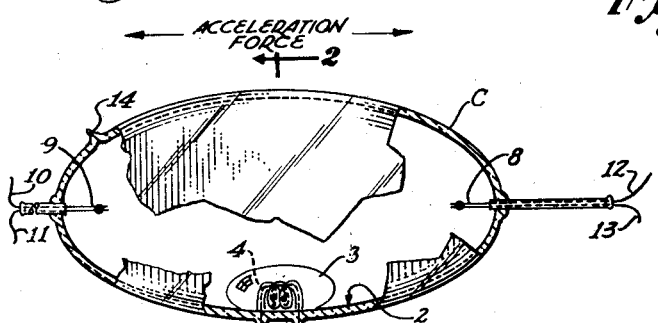
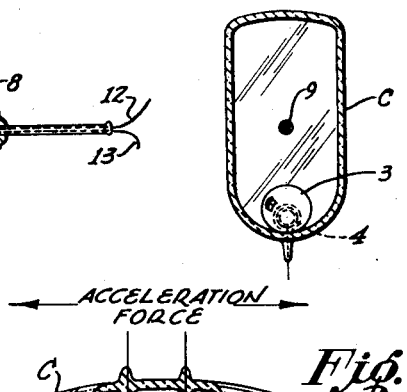
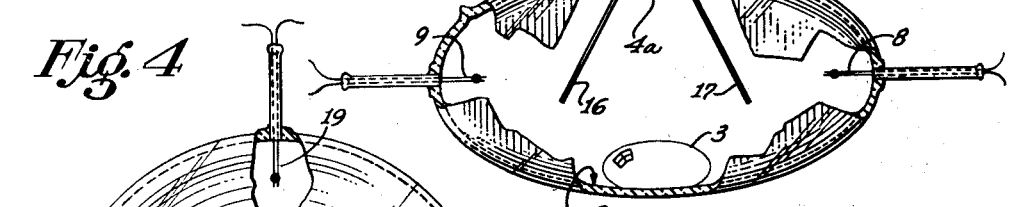
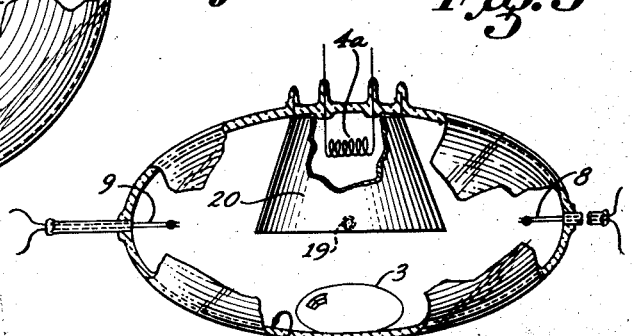
INVENTOR:
ROBERT D. HANCOCK
By Herbert E. Metcalf
HIS PATENT ATTORNEY Patented July 29, 1952

2,605,094

UNITED STATES PATENT OFFICE 2,605,094

ACCELEROMETER

Robert D. Hancock, Compton, Calif., assignor to Northrop Aircraft, Inc., Hawthorne, Calif., a corporation of California Application October 2, 1950, Serial No. 187,905

12 Claims. (Cl. 264—1)

This invention relates to accelerometers, and more particularly to a device for accurately measuring acceleration.

An object of the present invention is to provide a means and method for detecting and measuring accelerations so that the acceleration forces will be precisely known.

A further object is to provide a means whereby acceleration force will be made known as an electrical signal, and where the signal will be a function of the applied force.

Briefly, the present invention employs a type of bubble level having a concave supporting surface in which is placed a globule or a material which is susceptible to heat absorption and re-radiation, and which also displays a comparatively low surface tension while not tending to wet this said concave surface. This globule is so located that it will freely move over the concave surface when this surface is accelerated. Means are provided to continuously heat the globule, and heat responsive means are provided around the globule to determine the position of the globule with respect to known points on the concave surface. Mercury, due to its weight and other desirable characteristics, is a preferred material for the globule.

The nature of the invention can best be understood by the following description, taken in connection with the accompanying drawing, wherein:

Figure 1 is a vertical sectional and elevation view illustrating one embodiment of the present invention useable for sensing acceleration along a horizontal line.

Figure 2 is a cross sectional view of the device of Figure 1 taken as indicated by line 2—2 in Figure 1.

Figure 3 is a vertical sectional and elevational view of another embodiment of the invention similar to Figure 1.

Figure 4 is a horizontal sectional view showing a sensing element arrangement useable for sensing accelerations in a horizontal plane.

Figure 5 is a sectional view of the device of Figure 4, taken as indicated by line 5—5 in Figure 4.

Figure 6 is a diagram showing one type of indicating circuit for the devices of Figures 1 and 2.

Referring first to Figure 1, an accelerometer container C, in the form of a glass envelope for example, is provided with a concave lower surface 2, preferably a sector of a cylinder, on which a globule of mercury 3 rests. An electrical heating element 4 in the form of a fine wire spiral is held above the surface 2 by leads 5 and 6, in a position where the spiral is submerged in globule 3. The wire of heater 4 is sufficiently fine to offer negligible resistance to globule movement and can be covered with glass to prevent shorting of the turns by the mercury. Heater 4 is heated as by a source 7 under control of a variable resistor 7a. Inside container C and disposed adjacent to and on opposite sides of the globule of mercury 3 are two heat detecting elements 8 and 9 with external leads 10 and 11; 12 and 13 attached thereto, respectively. The heat detecting elements 8 and 9 are preferably sensitive resistors having the characteristic of rapidly varying in resistance with change of temperature. Such devices are well known in the trade as "Thermistors." It may be found desirable to evacuate container C as by use of exhaust tube 14, or to fill the container with gas at pressures such that convective currents of gas within the container are negligible, but so that conduction is possible.

In order to extend the range over which the globule of mercury 3 may move during the acceleration of the container, a heating element 4a may be disposed immediately above the globule 3 and shielded from the heat detecting means 8 and 9 by means of flat heat shields 16 and 17 as shown in Figure 3. The type of construction shown in Figures 1 and 2 is suitable for sensing accelerations along a horizontal line connecting the two heat detecting elements 8 and 9.

The heat detecting means may also be disposed in a configuration for sensing accelerations in a horizontal plane, as shown in Figures 4 and 5. Here the heat detecting means 8 and 9, together with additional heat sensitive means 18 and 19, are positioned equi-distantly about the globule of mercury 3 so that motion of the golbule along two dimensions in the horizontal plane over a spherical surface 2a can be sensed. In this case a heat shield in the form of a truncated cone 20 can be used.

A suitable Wheatstone bridge circuit for obtaining an output indication from opposed heat sensitive elements 8, 9, or 18, 19, when used, is shown in Figure 6.

Here the heat sensitive resistors 8 and 9 have one end of each connected together and to one side of a power source E. The other ends of resistors 8 and 9 are respectively connected to one end of each of two balancing resistors 21 and 22, these junctions being bridged by an indicating device M. The remaining ends of balancing resistors 21 and 22 are connected together and to the other side of power source E. Either A. C. or D. C. may be used at E, usually never greater than about 5 volts, when "Thermistors" are used. E may be a square wave pulse generator, a source of low voltage A. C. or D. C. In any case, the voltage of E should be such that the resistance of elements 8 and 9 does not measurably change due to power dissipation therein. When a sensitive galvanometer or vacuum tube voltmeter is used at M, temperature changes of the order of 1/500 of one degree C. can readily be sensed.

When heat sensitive elements 18 and 19 are used, a bridge similar to that described for elements 8 and 9 can be attached thereto. If desired, electrical means for comparing the two bridge outputs can also be used to determine the acceleration vector.

In the device described, the bridge is balanced with the globule midway between elements 8 and 9. Thereafter, a difference of detected heat, caused by change in radiation, conduction, or a combination of both from the surface of the globule of mercury 3 as the globule moves under acceleration of container C, is measured by the heat detecting means 8 and 9. If the globule of mercury moves so that it is closer to heat detecting means 8 than it is to element 9, for example, an unbalance in the external bridge circuit will occur and the motion or acceleration causing the displacement of the globule of mercury can thereby be measured at M.

It is to be noted that the heat supplied to the globule by heater 4 is to be regulated so that, under controlled temperature conditions external to the accelerometer, the globule temperature will remain substantially constant.

This invention has advantages in simplicity and high sensitivity. Differential temperature changes on the order of one five hundredth of a degree F. can be sensed. In addition, the concave surface 2 or 2a of the container may be readily shaped, for example, to such a curvature that the output of the bridge circuit will be linearily related to acceleration.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. Means for sensing accelerations comprising a container having a concave lower globule supporting surface, a globule of relatively heavy heat absorbing liquid freely movable over said surface, means for supplying heat to said globule, and heat sensitive and responsive means positioned on opposite sides of said globule adjacent said surface whereby a change of position of said globule due to acceleration of said container along a line connecting said heat sensitive means will cause a change in response of said latter means.

2. Apparatus in accordance with claim 1 wherein said globule is formed from mercury.

3. Apparatus in accordance with claim 1, wherein a heat shield is positioned between said globule heating means and said heat responsive means.

4. Apparatus in accordance with claim 1 wherein a plurality of pairs of heat responsive means are positioned around said globule to respond to movements of said globule in a horizontal plane.

5. Means for sensing accelerations comprising a container having a top and a bottom defining an enclosed space, the upper surface of said bottom being concave, a globule of mercury supported by said upper surface and free to move thereover, means for heating said globule, and heat sensitive and responsive means positioned on opposite sides of said globule and located to sense changes in heat received from said globule due to change in position of said globule due to acceleration of said container.

6. Apparatus in accordance with claim 5 wherein said globule heating means is positioned to contact said globule and heat same by heat conduction.

7. Apparatus in accordance with claim 5 wherein said globule heating means is positioned over said globule to heat said globule by radiation.

8. Apparatus in accordance with claim 5 wherein said globule heating means is positioned over said globule to heat said globule by radiation and wherein heat shields are interposed between said globule heating means and said heat responsive means to prevent heat radiation therebetween.

9. An accelerometer comprising means having a concave lower surface, a globule of mercury supported on said surface, means for supplying heat to said globule, two thermally sensitive resistors each having the characteristic of rapidly varying in resistivity with change of temperature positioned on diametrically opposite sides of said globule and at substantially equal distances therefrom when said accelerometer is at rest, said resistors being connected in a Wheatstone bridge circuit, current supply means for said bridge, and means connected to said bridge circuit to indicate the difference in temperature of said resistors as determined by the flow of heat from said globule when said globule changes position due to acceleration of said surface bearing means.

10. Apparatus in accordance with claim 9 wherein said globule heating means is in contact with said globule for conductive heating thereof.

11. Apparatus in accordance with claim 9 wherein said globule heating means is spaced from said globule for radiant heating thereof.

12. Apparatus in accordance with claim 9 wherein said globule heating means is spaced from said globule for radiant heating thereof, and wherein a heat shield is interposed between said globule heating means and said resistors.

ROBERT D. HANCOCK.

REFERENCES CITED

The following references are of record in the file of this patent:

UNITED STATES PATENTS

| Number | Name | Date |
|---|---|---|
| 2,023,740 | Mattern | Dec. 10, 1935 |
| 2,023,748 | Shipley | Dec. 10, 1935 |
| 2,044,427 | Giesler | June 16, 1936 |
| 2,120,178 | Hausrath | June 7, 1938 |
| 2,256,833 | McDonald | Sept. 23, 1941 |
| 2,435,231 | McPherson | Feb. 3, 1948 |